(12) United States Patent
Nishikiori et al.

(10) Patent No.: US 8,989,988 B2
(45) Date of Patent: Mar. 24, 2015

(54) CONTROL APPARATUS FOR INTERNAL COMBUSTION ENGINE

(75) Inventors: Takashi Nishikiori, Susono (JP); Norihisa Nakagawa, Numazu (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 384 days.

(21) Appl. No.: 13/634,055

(22) PCT Filed: Mar. 19, 2010

(86) PCT No.: PCT/JP2010/054861
§ 371 (c)(1),
(2), (4) Date: Sep. 11, 2012

(87) PCT Pub. No.: WO2011/114522
PCT Pub. Date: Sep. 22, 2011

(65) Prior Publication Data
US 2013/0006502 A1    Jan. 3, 2013

(51) Int. Cl.
*F02D 41/30* (2006.01)
*F02D 13/06* (2006.01)
(Continued)

(52) U.S. Cl.
CPC ............ *F02D 13/06* (2013.01); *F02D 13/0207* (2013.01); *F02D 41/0002* (2013.01);
(Continued)

(58) Field of Classification Search
CPC ........... F02D 1/00; F02D 43/00; F02D 41/22; F02D 13/06; F02D 17/02; F02D 41/20; F02D 41/3005; F02D 2250/00
USPC .......... 701/102–104, 107, 112–114; 123/321, 123/325, 481, 482, 198 D, 198 DB, 198 F, 123/90.11, 90.12, 90.1, 90.15
See application file for complete search history.

(56) References Cited

U.S. PATENT DOCUMENTS

| 6,736,114 | B2* | 5/2004 | Takahashi et al. ............ 123/491 |
| 7,607,410 | B2* | 10/2009 | Magner et al. ............ 123/90.15 |
| 2006/0196463 | A1* | 9/2006 | Pallett et al. ............... 123/192.1 |

(Continued)

FOREIGN PATENT DOCUMENTS

| JP | 58-20374 B2 | 4/1983 |
| JP | 60-45737 A | 3/1985 |
| JP | 62-247108 A | 10/1987 |
| JP | 5-187286 A | 7/1993 |

(Continued)

OTHER PUBLICATIONS

International Search Report & Written Opinion mailed Apr. 27, 2010 of PCT/JP2010/054861.

*Primary Examiner* — John Kwon
*Assistant Examiner* — Johnny H Hoang
(74) *Attorney, Agent, or Firm* — Kenyon & Kenyon LLP (57) ABSTRACT

Valve stopping control is performed that changes an operating state of an intake valve and an exhaust valve to a closed-valve stopped state when executing a fuel-cut operation. A device is provided that sets an in-cylinder return-time target air-fuel ratio for an initial two return cycles when returning from a fuel-cut operation. The return-time target air-fuel ratio is set so that respective air-fuel ratios of air-fuel mixtures of fuel and air injected into the same cylinder for respective cycles during the initial return cycles each become values that fall within a combustible range, and so that even if a total amount of fuel injected into the same cylinder for the initial return cycles is supplied into the cylinder during an arbitrary single cycle, the air-fuel ratio of the air-fuel mixture of the total amount of fuel and air becomes a value that falls within the combustible range.

6 Claims, 5 Drawing Sheets

(51) Int. Cl.
*F02D 13/02* (2006.01)
*F02D 41/00* (2006.01)
*F02D 41/12* (2006.01)
*F02D 41/14* (2006.01)
*F02D 41/22* (2006.01)

(52) U.S. Cl.
CPC .......... *F02D41/126* (2013.01); *F02D 41/1454* (2013.01); *F02D 41/22* (2013.01); *F02D 2041/0012* (2013.01); *F02D 2200/0802* (2013.01); *Y02T 10/42* (2013.01); *Y02T 10/18* (2013.01)
USPC .................. 701/104; 123/90.15; 123/482

(56) References Cited

U.S. PATENT DOCUMENTS

2009/0120390 A1* 5/2009 Ezaki et al. ................ 123/90.15
2010/0250103 A1* 9/2010 Shimo et al. ................ 701/108

FOREIGN PATENT DOCUMENTS

| JP | 2002-339774 A | 11/2002 |
| JP | 2003-97319 A | 4/2003 |
| JP | 2004-027995 A | 1/2004 |
| JP | 2004-100487 A | 4/2004 |
| JP | 2006-233828 A | 9/2006 |

* cited by examiner

106: Is there F/C return request accompanied by valve return?
108: Is there no abnormality in sensors and actuators concerning air/fuel?
120: Does abnormality occur in valve return operation?

Fig. 5

202: Calculate fuel injection amount at lean-side limit

Fig. 6

CONTROL APPARATUS FOR INTERNAL COMBUSTION ENGINE

CROSS REFERENCE TO RELATED APPLICATIONS

This is a 371 national phase application of PCT/JP2010/054861 filed 19 Mar. 2010, the contents of which are incorporated herein by reference.

TECHNICAL FIELD

The present invention relates to a control apparatus for an internal combustion engine, and more particularly to a control apparatus for an internal combustion engine that is equipped with a valve stop mechanism that is capable of maintaining at least one of an intake valve and an exhaust valve in a closed-valve stopped state.

BACKGROUND ART

A conventional air-fuel ratio control apparatus of an internal combustion engine that is equipped with a valve stop mechanism that is capable of executing valve stopping control that maintains an intake valve in a closed-valve stopped state is disclosed, for example, in Patent Document 1. According to the aforementioned conventional control apparatus, when resuming fuel supply from a state in which a cylinder is stopped accompanied by valve stopping control for an intake valve, correction of a fuel injection amount is performed that takes into consideration a fuel amount adhering to a wall surface of an intake port.

The applicants are aware of the following documents, which includes the above described document, as documents related to the present invention.

CITATION LIST

Patent Documents

Patent Document 1: Japanese Laid-open Patent Application Publication No. 2004-27995
Patent Document 2: Japanese Laid-open Patent Application Publication No. 2003-97319
Patent Document 3: Japanese Laid-open Patent Application Publication No. 2002-339774
Patent Document 4: Japanese Laid-open Patent Application Publication No. Hei 5-187286

SUMMARY OF INVENTION

Technical Problem

An internal combustion engine that is equipped with a valve stop mechanism for at least one of an intake valve and an exhaust valve is known, as in the conventional technique disclosed in the above described Patent Document 1. In an internal combustion engine equipped with such kind of valve stop mechanism, when returning from valve stopping control, due to a reason such as a response delay of the valve stop mechanism, in some cases a cycle in which the intake valve or exhaust valve actually returns to an operating state is later than a cycle in which resumption of fuel injection is performed.

For example, if the above described delay in valve return occurs in the configuration described in the aforementioned Patent Document 1, in a cycle in which the intake valve actually returns to an operating state, fuel that is injected for the cycle in which valve return was delayed will be supplied into the relevant cylinder together with the fuel that is injected for the current return cycle. When there is a delay of this kind in a valve return operation when returning from a fuel-cut operation, a state arises in which the oxygen amount required for combustion inside the cylinder is insufficient, and there is a concern that misfiring may occur.

The present invention has been conceived to solve the above described problem, and an object of the present invention is to provide a control apparatus for an internal combustion engine that can avoid the occurrence of misfiring when returning from valve stopping control even if a cycle in which a valve actually returns to an operating state is later than a cycle in which resumption of fuel injection is actually performed.

Solution to Problem

A first aspect of the present invention is a control apparatus for an internal combustion engine, comprising:
a fuel injection valve that injects fuel into an intake passage or into a cylinder;
a valve stop mechanism that is capable of changing an operating state of at least one valve among an intake valve and an exhaust valve between a valve operating state and a closed-valve stopped state;
fuel-cut operation execution means that executes a fuel-cut operation in a case where a predetermined execution condition is established during operation of the internal combustion engine;
valve stopping execution means that executes valve stopping control that changes an operating state of the at least one valve from the valve operating state to the closed-valve stopped state at a time of execution of the fuel-cut operation;
fuel-cut operation return request detection means that detects a request to return from the fuel-cut operation;
valve return execution means that, when the request to return from the fuel-cut operation is detected, in synchrony with or in advance of an operation to resume fuel injection, executes a valve return operation that changes the operating state of the at least one valve from the closed-valve stopped state to the valve operating state; and
return-time air-fuel ratio setting means that sets an in-cylinder target air-fuel ratio in initial return cycles that corresponds to an initial at least two cycles at a time of return from the fuel-cut operation,
wherein the target air-fuel ratio is set so that respective air-fuel ratios of air-fuel mixtures of fuel and air injected into a same cylinder for respective cycles during the initial return cycles each become a value that falls within a combustible range, and is also set so that even if a total amount of fuel that is injected into a same cylinder for the initial return cycles is supplied into the cylinder during an arbitrary single cycle, an air-fuel ratio of an air-fuel mixture of the total amount of fuel and air becomes a value that falls within the combustible range.

A second aspect of the present invention is the control apparatus for an internal combustion engine according to the first aspect of the present invention, further comprising:
valve return abnormality determination means that determines whether or not an abnormality has occurred in the valve return operation; and
fuel injection stopping means that stops fuel injection with respect to a cylinder for which the valve return abnormality determination means determines that an abnormality has occurred in the valve return operation after the initial return cycles have passed.

A third aspect of the present invention is the control apparatus for an internal combustion engine according to the first or second aspect of the present invention, further comprising catalyst temperature acquisition means that acquires a temperature of a catalyst that is disposed in an exhaust passage, wherein, when the temperature of the catalyst is higher than a predetermined temperature, the return-time air-fuel ratio setting means sets the target air-fuel ratio to a richer value compared to when the temperature of the catalyst is less than or equal to the predetermined temperature.

A fourth aspect of the present invention is the control apparatus for an internal combustion engine according to any one of the first to third aspects of the present invention, wherein the target air-fuel ratios for respective cycles during the initial return cycles, which are set by the return-time air-fuel ratio setting means, are values that are leaner than a theoretical air-fuel ratio.

A fifth aspect of the present invention is the control apparatus for an internal combustion engine according to any one of the first to fourth aspects of the present invention, wherein the valve return execution means is means that, when a request to return from the fuel-cut operation is detected, executes the valve return operation in synchrony with an operation to resume fuel injection, and wherein fuel injection at the target air-fuel ratio that is set by the return-time air-fuel ratio setting means is started from a first cycle when executing the valve return operation in response to a request to return from the fuel-cut operation.

Advantageous Effects of Invention

According to the first aspect of the present invention, even if a valve return operation of the at least one valve described above is not performed normally in a certain cycle during the above described initial return cycles when returning from a fuel-cut operation, an in-cylinder air-fuel ratio in each cycle during the initial return cycles is a value that is within a combustible range. It is therefore possible to avoid the occurrence of misfiring during the initial return cycles.

According to the second aspect of the present invention, in a case where a valve return operation is not performed even after the aforementioned initial return cycles have passed, a delay in a valve return operation of one or a plurality of cycles and a malfunction that is not a temporary malfunction such as a valve sticking are differentiated, and a countermeasure can be implemented in accordance with the extent of the abnormality.

According to the third aspect of the present invention, when the temperature of the catalyst is higher than the above described predetermined temperature, since more oxygen in a cylinder is consumed by combustion, the amount of oxygen that flows into the catalyst in an initial stage after valve return can be decreased. Therefore, according to the present invention, it is possible to suppress deterioration of the catalyst while avoiding the occurrence of misfiring at a time of return by means of the aforementioned first or second aspect of the present invention.

According to the fourth aspect of the present invention, adjustment of the in-cylinder air-fuel ratio during the aforementioned initial return cycles to within a combustible range can be facilitated.

According to the fifth aspect of the present invention, unlike a case where a valve return operation is implemented in advance of an operation to resume fuel injection, since an inflow of fresh air into the catalyst at a time of valve return can be reliably prevented, deterioration of the catalyst can be suppressed.

DESCRIPTION OF EMBODIMENTS

Embodiment 1

Description of System Configuration

Figure 1:
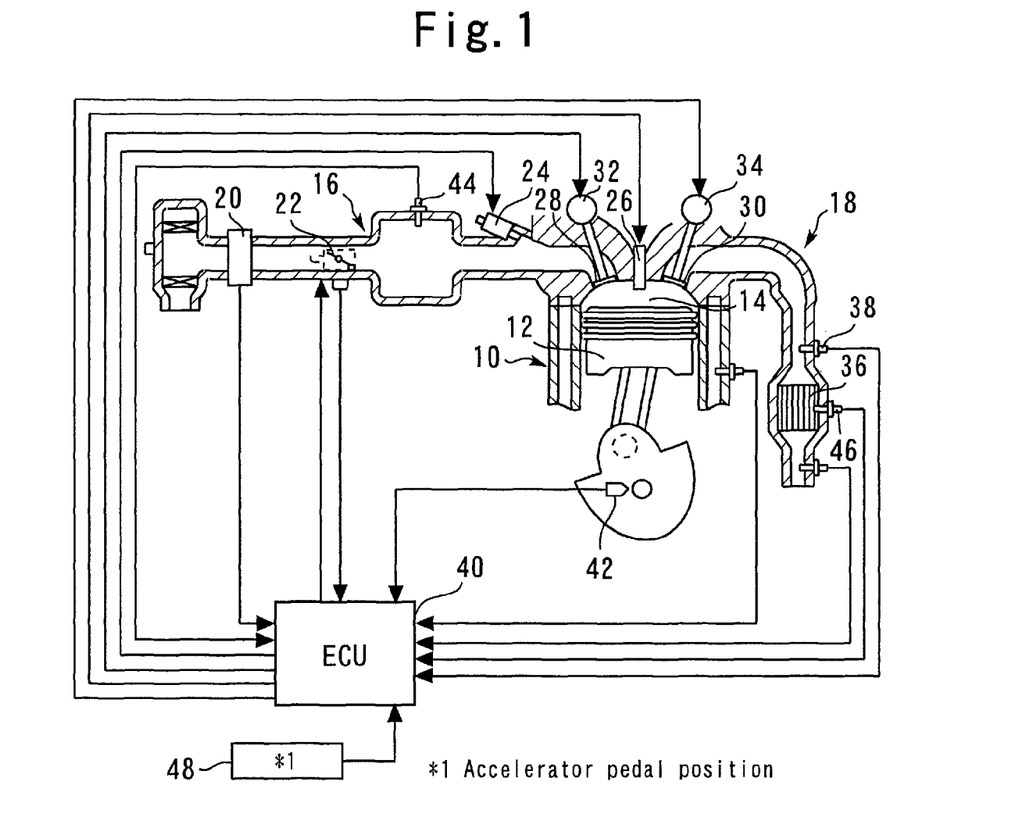
FIG. 1 is a view for describing the configuration of an internal combustion engine according to Embodiment 1 of the present invention.

FIG. 1 is a view for describing the configuration of an internal combustion engine 10 according to Embodiment 1 of the present invention. The system of the present embodiment includes a spark-ignition internal combustion engine (gasoline engine) 10. According to the present embodiment, as one example, the internal combustion engine 10 is an in-line four-cylinder engine that has four cylinders #1 to #4.

A piston 12 is provided in each cylinder of the internal combustion engine 10. A combustion chamber 14 is formed at the top side of the piston 12 in each cylinder of the internal combustion engine 10. An intake passage 16 and an exhaust passage 18 communicate with the combustion chamber 14.

An air flow meter 20 that outputs a signal in accordance with the flow rate of air that is drawn into the intake passage 16 is provided in the vicinity of an inlet of the intake passage 16. A throttle valve 22 is provided downstream of the air flow meter 20. The throttle valve 22 is an electronically controlled throttle valve that can control a degree of throttle opening independently of a position of an accelerator pedal.

A fuel injection valve 24 for injecting fuel into an intake port of the intake passage 16 is provided in a cylinder head included in the internal combustion engine 10. A spark plug 26 is also provided in the cylinder head included in the internal combustion engine 10. The spark plug 26 is arranged so as to protrude into the combustion chamber 14 from the top of the combustion chamber 14. An intake valve 28 and an exhaust valve 30 are provided in an intake port and an exhaust port, respectively. The intake valve 28 and the exhaust valve 30 are used to place the combustion chamber 14 and the intake passage 16, or the combustion chamber 14 and the exhaust passage 18 in a connecting state or a cut-off state, respectively.

The intake valve 28 and the exhaust valve 30 are driven by an intake variable valve operating apparatus 32 and an exhaust valve operating apparatus 34, respectively. The intake variable valve operating apparatus 32 has a valve stop mechanism that is capable of changing the operating state of the intake valve 28 between a valve operating state and a closed-valve stopped state in cylinder units. Similarly, the exhaust variable valve operating apparatus 34 has a valve stop mechanism that is capable of changing the operating state of the exhaust valve 30 between a valve operating state and a closed-valve stopped state in cylinder units. A specific configuration that realizes the above described valve stop mechanism is not particularly limited. For example, the valve stop mechanism can be realized by a configuration that, using a switching pin, is capable of pausing a rocking action of a rocker arm that transmits an acting force of a cam to a valve. Herein, in the following description, control that switches the operating state of the intake valve 28 or the exhaust valve 30 from a valve operating state to a closed-valve stopped state is referred to as "valve stopping control". Further, an operation that switches the operating state of the intake valve 28 or the exhaust valve 30 from the closed-valve stopped state to the valve operating state is referred to as a "valve return operation".

A catalyst 36 for purifying exhaust gas is disposed in the exhaust passage 18. Further, an A/F sensor 38 for detecting the air-fuel ratio of exhaust gas is arranged in the exhaust passage 18 on the upstream side of the catalyst 36.

The system shown in FIG. 1 includes an ECU (Electronic Control Unit) 40. Various sensors for detecting the operating state of the internal combustion engine 10 such as, in addition to the aforementioned air flow meter 20, a crank angle sensor 42 for detecting the number of engine revolutions, an intake air pressure sensor 44 for detecting the pressure of intake air (intake manifold pressure), a catalyst temperature sensor 46 for detecting the temperature of the catalyst 36, and an accelerator pedal position sensor 48 for detecting the position of the accelerator pedal of a vehicle are connected to an input side of the ECU 40. The various actuators described above are connected to an output side of the ECU 40. The ECU 40 can control the operating state of the internal combustion engine 10 based on the outputs of these sensors.

[Issues When Returning from Valve Stopping Control]

Figure 2:
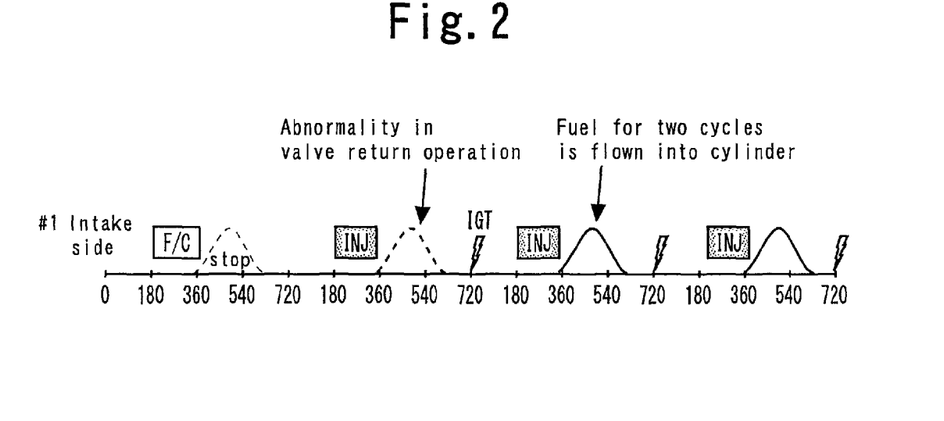
FIG. 2 is a view that illustrates an example of operations on an intake side in a certain cylinder when returning from valve stopping control in response to a request to return from a fuel-cut operation.

FIG. 2 is a view that illustrates an example of operations on an intake side in a certain cylinder when returning from valve stopping control in response to a request to return from a fuel-cut operation. The horizontal axis in FIG. 2 represents a crank angle. In this connection, in FIG. 2, a lift curve of the intake valve 28 that is indicated by a thin broken line represents a closed-valve stopped state, a lift curve of the intake valve 28 that is indicated by a thick broken line represents a case in which an abnormality occurred in a valve return operation, and a lift curve of the intake valve 28 that is indicated by a solid line represents a valve operating state. Further, in FIG. 2, the characters "INJ" denote a fuel injection timing, and the characters "IGT" denote an ignition timing. This method of diagrammatic representation is the same in FIG. 3 that is described later.

FIG. 2 illustrates a case in which, when a request to return from a fuel-cut operation (F/C) that is accompanied by a valve return request with respect to the intake valve 28 was detected, a valve return operation was not performed normally in a first cycle after detecting the return request. As in the case illustrated in FIG. 2, when returning from valve stopping control with respect to the intake valve 28, due to a reason such as a response delay of the valve stop mechanism, in some cases a cycle in which the intake valve 28 actually returns to an operating state is later than a cycle in which resumption of fuel injection is performed. When this kind of a delay in valve return has occurred, fuel that has been injected for the cycle in which the delay occurred remains at the intake port. Consequently, in a cycle in which the intake valve 28 actually returns to an operating state, the fuel that was injected for the cycle in which the delay occurred is supplied into the cylinder (into the combustion chamber 14) together with fuel that is injected for the current return cycle. As a result, the in-cylinder air-fuel ratio becomes excessively rich, and there is a concern that misfiring will occur. In addition, if such kind of misfiring occurs, exhaust emissions deteriorate and there is a risk that a rich, unburned air-fuel mixture that flows out to the exhaust passage 18 will adversely affect the catalyst 36.

An abnormality in a valve return operation can be detected by providing a lift sensor for detecting the existence or non-existence of a lift operation of the intake valve 28 for the respective intake valves 28. However, in the case of a system that injects fuel into an intake port, as in the case of the fuel injection valve 24 of the present embodiment, as shown in FIG. 2, it is necessary that fuel injection for a certain cycle be performed prior to an opening/closing operation of the intake valve 28 of the same cycle. Accordingly, when performing a valve return operation and an operation to resume fuel injection synchronously, in at least an initial cycle an abnormality in the valve return operation cannot be detected prior to the fuel injection timing. Further, when a fuel injection valve is included that can directly inject fuel into a cylinder, after starting an opening/closing operation of the intake valve, it is possible to perform fuel injection for the cycle in which the opening/closing operation is being performed. However, if the existence/non-existence of an abnormality in a valve return operation is determined during an opening/closing period of an intake valve in a certain cycle, and the existence of an abnormality is recognized, it is difficult to implement a countermeasure whereby fuel injection is stopped immediately or the fuel injection amount is decreased in the same cycle. There is also the possibility that an abnormality in a valve return operation will be erroneously determined due to an abnormality of the sensor that is used to detect an abnormality in a valve return operation, and furthermore, a time required for a single cycle shortens as the number of engine revolutions increases. It can be said that the aforementioned countermeasures are difficult to implement due to these reasons also.

Characteristic Control in Embodiment 1

Figure 3:
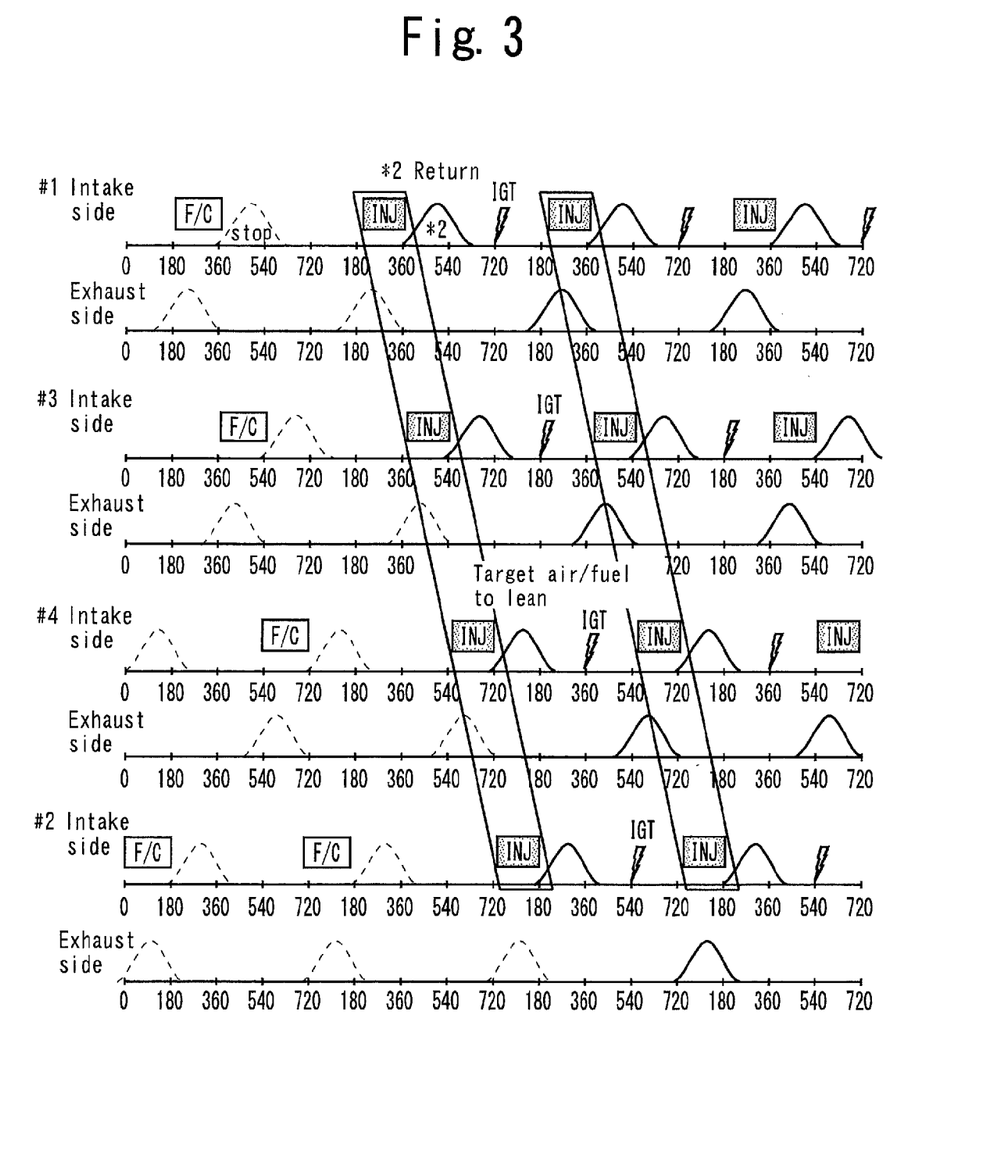
FIG. 3 is a view for describing control of a target air-fuel ratio at a time of valve return according to Embodiment 1 of the present invention.

FIG. 3 is a view for describing control of a target air-fuel ratio at a time of valve return according to Embodiment 1 of the present invention.

As shown in FIG. 3, according to the present embodiment, as a premise, it is assumed that a configuration is adopted so as to perform valve stopping control with respect to the intake valve 28 and exhaust valve 30 of all cylinders when a request to execute a fuel-cut operation is issued. Further, when a request to return from a fuel-cut operation that is accompanied by such valve stopping control is issued, an operation to resume fuel injection (and ignition) and a valve return operation in each cylinder are synchronized and started in the same cycle.

Moreover, according to the present embodiment, as shown in FIG. 3, a configuration is adopted so that in the first two cycles at the start of return from a fuel-cut operation accompanied by a valve return request, a lean return mode is executed that makes an in-cylinder target air-fuel ratio of each cylinder leaner than a theoretical air-fuel ratio. Herein, the target air-fuel ratio that is set in the first two cycles at the start of return is referred to as "return-time target air-fuel ratio".

More specifically, in the lean return mode, the return-time target air-fuel ratio is set so as to satisfy the following two conditions. That is, the return-time target air-fuel ratio is set so that respective air-fuel ratios of air-fuel mixtures of fuel and air injected into the same cylinder for respective cycles during the aforementioned two cycles each become a value that falls within a combustible range. Further, the return-time target air-fuel ratio is set so that even if a total amount of fuel that is injected into the same cylinder for the aforementioned two cycles is an amount that is supplied one time into the cylinder during an arbitrary single cycle (in the example shown in FIG. 3, corresponds to the second cycle after the resumption of fuel injection), the air-fuel ratio becomes a value that falls within a combustible range. Note that, the term "combustible range" as used herein refers to a range of air-fuel ratios at which an air-fuel mixture of air and fuel (in this case, gasoline) that is supplied into a cylinder is combustible.

In a port-injection type internal combustion engine that uses gasoline as fuel as in the case of the internal combustion engine 10 of the present embodiment, although the combustible range for an air-fuel mixture that is supplied into a cylinder at the time of operation varies depending on the operating state of the internal combustion engine (valve timing, cooling water temperature and the like), in general the combustible range is a range of values of the order of 8 to 18 that is determined based on a rich-side limit that is a value of the order of 8 and a lean-side limit that is a value of the order of 18. In this connection, the numerical values indicated here are values that are previously determined by experiment and the like as values that can ensure reliable combustion without the occurrence of misfiring at a time of actual operation of the internal combustion engine 10.

In the internal combustion engine 10 in which a combustible range of air-fuel mixtures is of the order of 8 to 18 on an air-fuel ratio basis, as one example, it is suitable to set the aforementioned return-time target air-fuel ratio to 18. By setting the return-time target air-fuel ratio in this manner, when a valve return operation is normally performed in a first cycle in which fuel injection is resumed, the air-fuel ratio of an air-fuel mixture supplied into a cylinder will be a value of 18, that is a value within the aforementioned combustible range. Therefore, combustion will be possible in the first cycle. Further, even if a valve return operation of the intake valve 28 is not performed normally in the aforementioned first cycle, the air-fuel ratio of the air-fuel mixture supplied into the cylinder in the second cycle will be a value of 9 since the air-fuel ratio in question is the air-fuel ratio of the air-fuel mixture of the total amount of fuel and air injected for both the first and second cycles, and this value is also within the above described combustible range. Therefore, even if an abnormality occurs in a valve return operation in the first cycle, combustion is possible in the second cycle. Note that, when setting the target air-fuel ratio for the first and second cycles to the same value, 15 is not suitable as the value of the return-time target air-fuel ratio of the present embodiment, even if 15 is a value that is leaner than the theoretical air-fuel ratio. The reason is that when the target air-fuel ratio is set to 15, if an abnormality occurs in a valve return operation in the first cycle, the in-cylinder air-fuel ratio in the second cycle will be 7.5, and this value is outside the rich-side limit of the aforementioned combustible range.

Specific Processing in Embodiment 1

Figure 4:
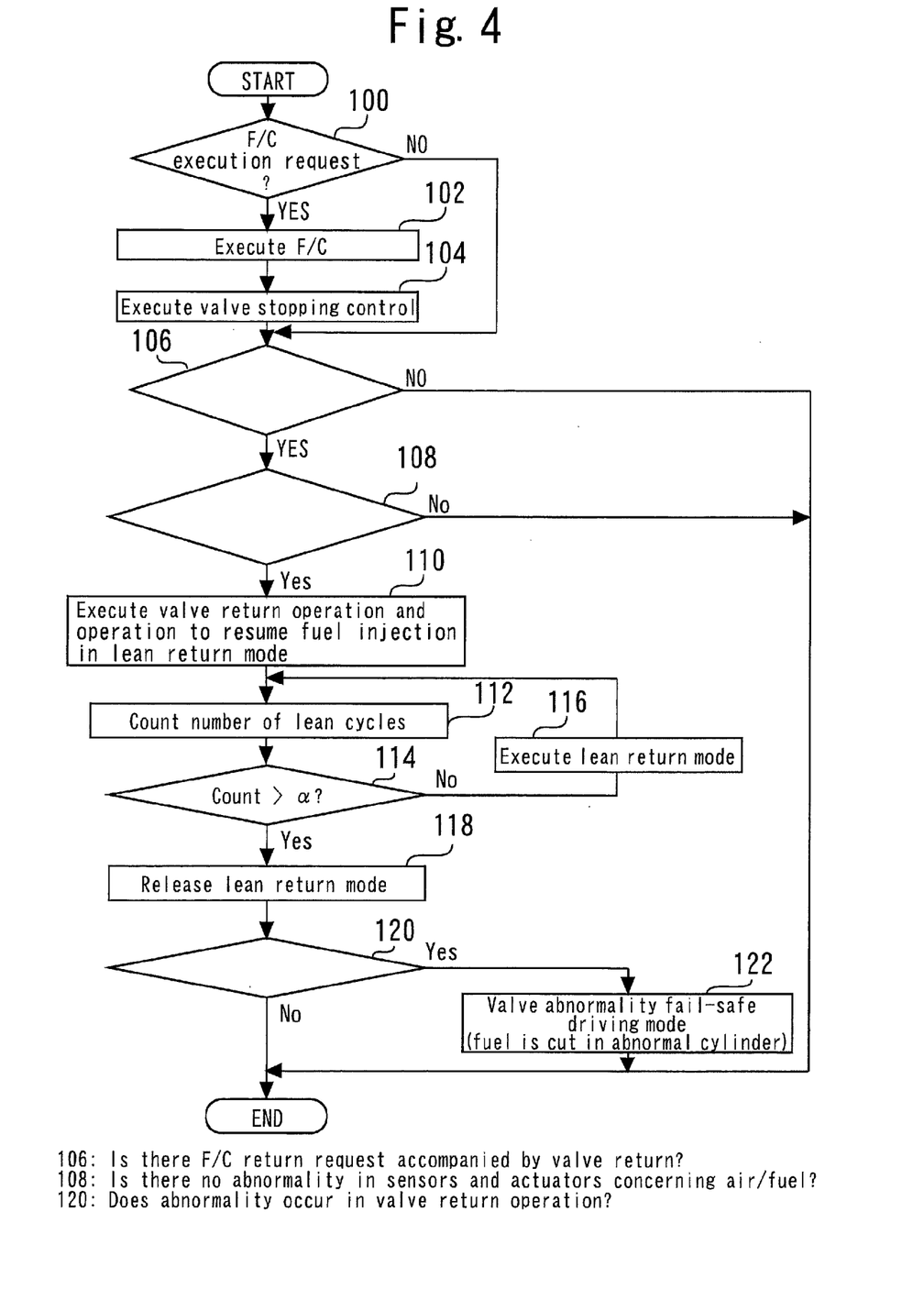
FIG. 4 is a flowchart of a main routine that is executed in Embodiment 1 of the present invention.

FIG. 4 is a flowchart that illustrates a control routine that the ECU 40 executes to implement control when returning from a fuel-cut operation according to an embodiment 1 of the present invention.

According to the routine shown in FIG. 4, first, based on the output of the accelerator pedal position sensor 48 and the like, the ECU 40 determines whether or not there is a request to execute a fuel-cut operation (F/C) (step 100).

If the ECU 40 determines as a result that there is a request to execute a fuel-cut operation, the fuel-cut operation is executed (step 102), and valve stopping control is also executed with respect to the intake valves 28 and the exhaust valves 30 of all cylinders (step 104).

Next, based on a determination as to whether or not the accelerator pedal has been depressed and the like, the ECU 40 determines whether or not there is a request to return from the fuel-cut operation that is accompanied by a return request with respect to all of the intake and exhaust valves 28 and 30 (step 106). If the ECU 40 determines as a result that there is a request to return from the aforementioned fuel-cut operation, the ECU 40 determines whether or not there is no abnormality in the sensors (A/F sensor 38, air flow meter 20 and the like) and actuators (fuel injection valve 24, spark plug 26 and the like) that are involved in control of the air-fuel ratio (step 108).

If the result determined in the aforementioned step 108 is affirmative, next, a valve return operation with respect to the intake and exhaust valves 28 and 30 that are being subjected to valve stopping control and an operation to resume fuel injection in the above described lean return mode are executed synchronously (step 110).

Figure 5:
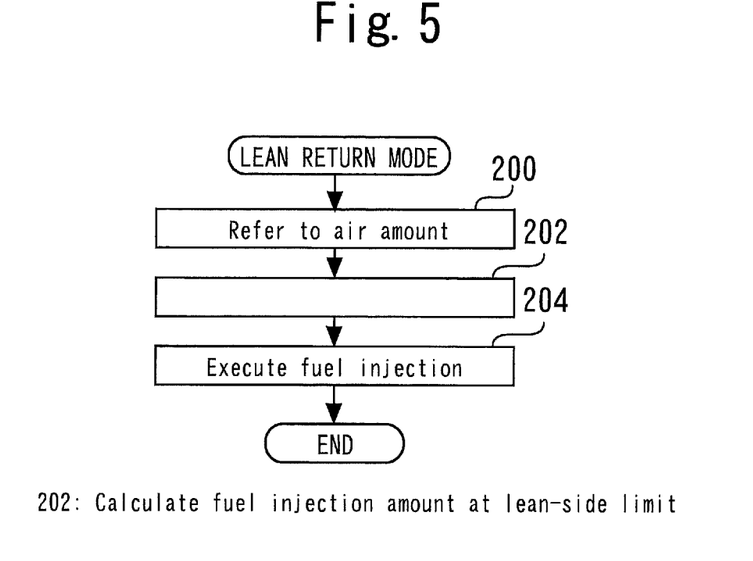
FIG. 5 is a flowchart of a sub routine that is executed in Embodiment 1 of the present invention.

FIG. 5 is a flowchart of a subroutine that the ECU 40 executes to implement the lean return mode in step 110 of the routine shown in FIG. 4.

In the subroutine shown in FIG. 5, first, an air amount that is drawn into each cylinder during the lean return mode is calculated (step 200). An air amount in the present step 200 can be calculated, for example, by referring to a map (not shown) that is previously determined by experimentation and the like, based on detection values for the current intake manifold pressure and number of engine revolutions or the like.

Next, the ECU 40 calculates a fuel injection amount so that the value (18) of the lean-side limit of the above described combustible range is obtained as the return-time target air-fuel ratio, based on the relation with respect to the air amount calculated in the aforementioned step 200 (step 202). Subsequently, fuel injection is executed at a predetermined fuel injection timing (step 204).

Further, in the routine shown in FIG. 4, after the processing in the above described step 110 is executed, a count of the number of lean cycles is incremented by one (step 112). The term "number of lean cycles" used herein refers to a number of cycles performed during the above described lean return mode. Subsequently, the ECU 40 determines whether or not the count of the number of lean cycles is greater than a predetermined value a (step 114). According to the present embodiment, as described above referring to FIG. 3, a configuration is adopted so that the lean return mode is executed in the first two cycles at the start of return from a fuel-cut operation accompanied by a valve return request. Accordingly, the predetermined value a in the present step 114 is set to 2.

If it is determined in the above described step 114 that the counter value is not greater than the predetermined value a, that is, when it can be determined that the situation is one in which execution of the lean return mode should be continued, the respective processes of the lean return mode shown in FIG. 5 are executed once more (step 116). Thereafter, the count of the number of lean cycles is incremented by one (step 112).

In contrast, in the aforementioned step 114, if it is determined that the counter value is greater than the predetermined value a, the lean return mode is released (step 118). Thus, the operation mode of the internal combustion engine 10 is switched to the normal operation mode.

Next, the ECU 40 determines whether or not there is a cylinder in which an abnormality occurred during the valve return operation (step 120). An operation to determine an abnormality in a valve return operation can be executed, for example, by the following technique. In a cylinder in which a valve return operation has been performed normally, combustion is performed under the aforementioned return-time target air-fuel ratio. As a result, lean exhaust gas that is in accordance with the return-time target air-fuel ratio is discharged from the relevant cylinder. In contrast, the above described lean exhaust gas is not discharged from a cylinder in which an abnormality occurred during a valve return operation with respect to the intake valve 28. Therefore, by assessing the output of the A/F sensor 38 while taking into consideration the timing at which gas from each cylinder arrives at the A/F sensor 38, it is possible to identify a cylinder in which an abnormality occurred during a valve return operation.

In the aforementioned step 120, if it is determined that there is a cylinder in which an abnormality occurred during a valve return operation, the operation mode of the internal combustion engine 10 is switched to a valve abnormality fail-safe driving mode (step 122). More specifically, in the valve abnormality fail-safe driving mode, processing is executed that stops fuel injection with respect to the abnormal cylinder in which the intake valve 28 has not returned normally to a valve operating state.

According to the routine shown in the above described FIG. 4, when executing return from a fuel-cut operation in synchrony with execution of a valve return operation, the aforementioned lean return mode is executed for the first two cycles. During the lean return mode, based on the principles of the return-time target air-fuel ratio that was described above with reference to FIG. 3, the return-time target air-fuel ratio is set to 18 as one example thereof. Consequently, even if a valve return operation is delayed by one cycle and is not in synchrony with fuel injection, the air-fuel ratio of an air-fuel mixture in the cylinder can be maintained within the combustible range. As a result, even if a delay of one cycle arises in a valve return operation, the occurrence of misfiring can be avoided. Further, because the occurrence of misfiring can be avoided, it is possible to prevent a deterioration in exhaust emissions and also prevent an inflow of a rich, unburned air-fuel mixture into the catalyst 36.

In addition, according to the above described routine, if it is determined that a valve return operation is not performed normally after the lean return mode has ended, fuel injection with respect to a cylinder in which a valve return operation abnormality occurred is stopped. If the intake valve 28 has not returned to a valve operating state even after the end of the number of lean cycles in which the aforementioned lean return mode is executed after an instruction to execute a valve return operation, it can be determined that a malfunction that is not temporary, such as a valve sticking, has occurred. Thus, according to the processing of the above described routine, it is possible to distinguish between a delay in a valve return operation of the order of one cycle and a malfunction such as a valve sticking, and as a result, a countermeasure can be implemented that is in accordance with the extent of the abnormality. Further, by executing the above described lean return mode at the start of return, the execution time period can be utilized to gain time in which to perform the above described determination with respect to an abnormality in the valve return operation. It is thereby possible to improve the accuracy of detecting an abnormality in a valve return operation.

Further, according to the above described routine, when a request to return from a fuel-cut operation that is accompanied by valve stopping control is detected, a valve return operation and an operation to resume fuel injection (and ignition) are synchronized and executed in the same cycle. Thus, unlike a case in which a valve return operation is executed in advance of an operation to resume fuel injection, an inflow of fresh air to the catalyst 36 at the time of valve return can be reliably prevented, and hence deterioration of the catalyst 36 can be suppressed.

In the above described Embodiment 1, a configuration is adopted so as to execute the lean return mode in the first two cycles when returning from a fuel-cut operation. However, the initial return cycles in which setting of a target air-fuel ratio that is characteristic of the present invention is performed is not limited to the above described example of two cycles. That is, in addition to the operating states of the internal combustion engine 10 mentioned previously, a combustible range of an air-fuel ratio of an air-fuel mixture that is supplied into a cylinder of an internal combustion engine also varies depending on, for example, whether the fuel injection type of the internal combustion engine is a port injection type or an in-cylinder direct injection type. Although an example of a combustible range of the port-injection type internal combustion engine 10 is described in the above Embodiment 1, in the case of an in-cylinder direct injection type internal combustion engine, as one example, a combustible range of air-fuel ratios of air-fuel mixtures is of the order of from 8 to 24. Accordingly, in an internal combustion engine having the aforementioned kind of wide combustible range, the aforementioned initial return cycles may be set to three cycles. By setting the initial return cycles in this manner, even if a valve return operation is delayed by one cycle, the in-cylinder air-fuel ratio in the second cycle will be 12 and, furthermore, even if a valve return operation is delayed by two cycles, the in-cylinder air-fuel ratio in the third cycle will be 8. It is thus possible to make the in-cylinder air-fuel ratio a value that is within the above described combustible range in the case of either delay. In this connection, depending on the width of the combustible range, naturally the above described number of initial return cycles may be increased to four or five cycles or more.

Further, in the above described Embodiment 1, an example is described in which the target air-fuel ratio in the two cycles in which the lean return mode is executed is set to the same value (18). However, a method of setting a target air-fuel ratio in the initial return cycles of the present invention is not limited thereto, and for example, target air-fuel ratios in respective cycles during at least two initial return cycles may be set to different values.

In addition, in the above described Embodiment 1 an example is described of a configuration that performs valve stopping control with respect to the intake and exhaust valves 28 and 30 of all cylinders when executing a fuel-cut operation. However, an object of the present invention is not limited thereto, and a configuration may also be adopted that takes some of the cylinders of an internal combustion engine as an object, and performs reduced-cylinder operation by executing a fuel-cut operation that is accompanied by valve stopping control.

Further, in the above described embodiment, an example is described of a configuration that performs valve stopping control with respect to the intake and exhaust valves 28 and 30 when executing a fuel-cut operation. However, an object of the present invention is not limited thereto, and a configuration may also be adopted that performs valve stopping control with respect to either one of the intake valve and the exhaust valve when executing a fuel-cut operation.

Furthermore, in the above described Embodiment 1 a configuration is adopted in which, when returning from a fuel-cut operation, execution of a valve return operation and an operation to resume fuel injection are performed synchronously. However, the present invention is not necessarily limited to a configuration that performs these operations synchronously. A configuration may also be adopted in which, for example, a valve return operation is executed one or several cycles prior to an operation to resume fuel injection.

Note that, in the above described Embodiment 1, the valve stop mechanism that includes the intake variable valve operating apparatus 32 and the exhaust variable valve operating apparatus 34 corresponds to the "valve stop mechanism" in the above described first aspect of the present invention. Further, the "fuel-cut operation execution means" according to the first aspect of the present invention is realized by the ECU 40 executing the processing of the above described step 100, the "valve stopping execution means" according to the first aspect of the present invention is realized by the ECU 40 executing the processing of the above described step 104, the "fuel-cut operation return request detection means" according to the first aspect of the present invention is realized by the ECU 40 executing the processing of the above described step 106, the "valve return execution means" according to the first aspect of the present invention is realized by the ECU 40 executing the processing of the above described step 110, and the "return-time air-fuel ratio setting means" according to the first aspect of the present invention is realized by the ECU 40 executing the lean return mode in the above described step 110.

In addition, the "valve return abnormality determination means" according to the above described second aspect of the present invention is realized by the ECU 40 executing the processing of the above described step 120, and the "fuel injection stopping means" according to the second aspect of the present invention is realized by the ECU 40 executing the processing of the above described step 122.

Embodiment 2

Figure 6:
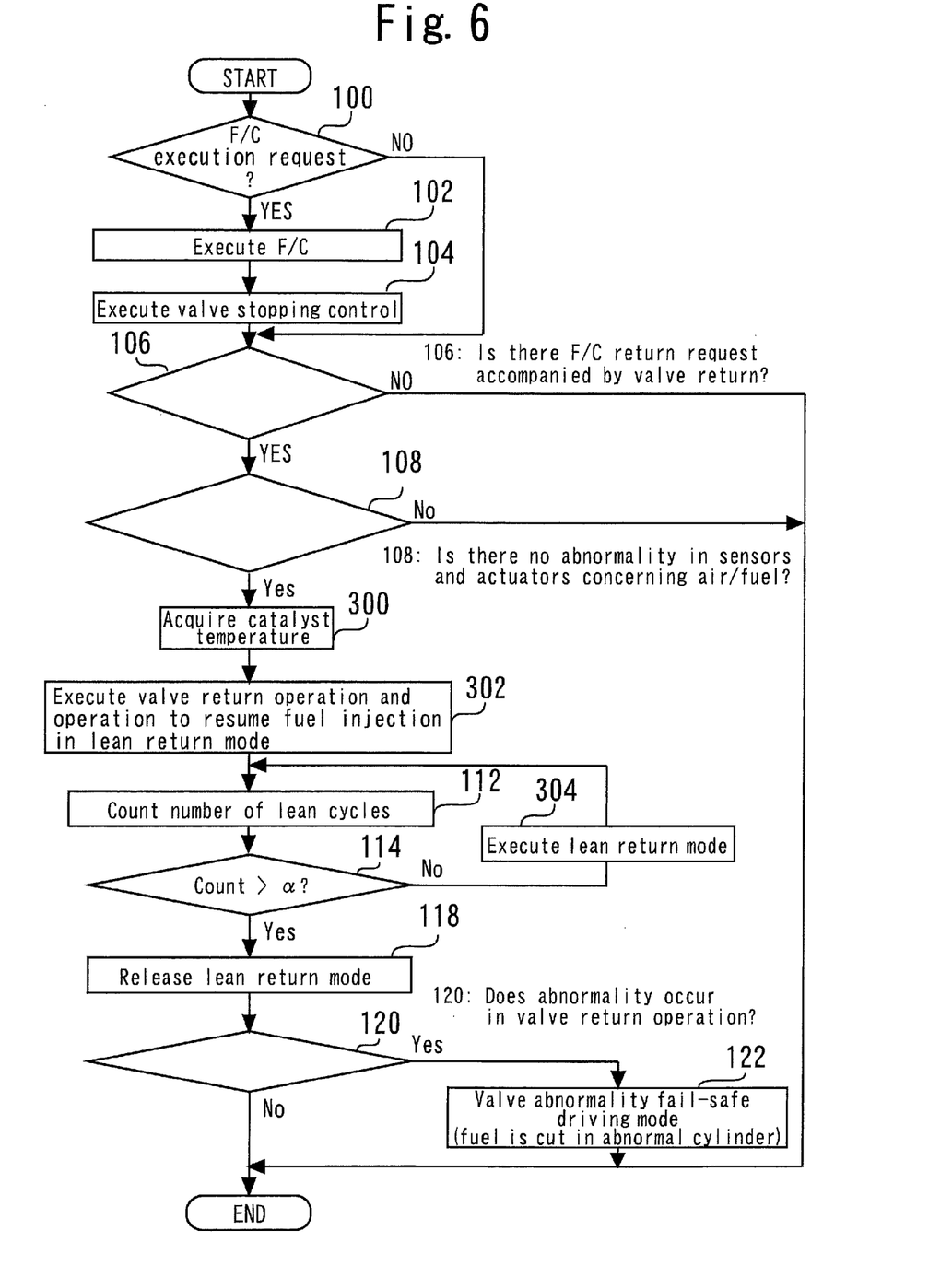
FIG. 6 is a flowchart of a main routine that is executed in Embodiment 2 of the present invention.

Next, Embodiment 2 of the present invention is described referring to FIG. 6.

The system of the present embodiment can be realized by causing the ECU 40 to execute a routine shown in FIG. 6 that is described later instead of the routine shown in FIG. 4, using the hardware configuration shown in FIG. 1.

A feature of the control of the present embodiment is that a return-time target air-fuel ratio in the lean return mode is varied in accordance with fluctuations in the temperature of the catalyst 36. More specifically, a configuration is adopted so that when the temperature of the catalyst 36 is higher than a predetermined temperature, in comparison to a case in which the temperature of the catalyst 36 is less than or equal to the predetermined temperature, the return-time target air-fuel ratio is set to a richer value within a range that conforms to the above described combustible range of air-fuel ratios in the internal combustion engine 10.

FIG. 6 is a flowchart that illustrates a control routine that the ECU 40 executes in Embodiment 2 to realize the above described functions. In this connection, in FIG. 6, steps that are the same as steps shown in FIG. 4 with respect to Embodiment 1 are denoted by the same reference numerals, and a description of those steps is omitted or simplified below.

In the routine shown in FIG. 6, if it is determined in the above described step 106 that there is a request to return from a fuel-cut operation accompanied by a request for return of the intake and exhaust valves 28 and 30, after executing the processing of the above described step 108, the temperature of the catalyst 36 is acquired (step 300). In this connection, instead of detecting the temperature of the catalyst 36 by means of a temperature sensor, the temperature of the catalyst 36 may be estimated, for example, based on the operation record of the internal combustion engine 10.

Next, a valve return operation for the intake and exhaust valves 28 and 30 which are being subjected to valve stopping control, and an operation to resume fuel injection in the above described lean return mode are executed (step 302). More specifically, the lean return mode in the present routine differs from the lean return mode in the routine shown in the above described FIG. 4 in the following respect. That is, in the lean return mode according to the present routine, it is determined whether or not the temperature of the catalyst 36 is higher than a predetermined temperature. In this case, the term "predetermined temperature" refers to a value that is previously set as a threshold value for determining whether or not the circumstances are such that there is a concern that deterioration of the catalyst 36 will occur due to fresh air flowing into the catalyst 36. In the present step 302, if the result of that determination indicates that the temperature of the catalyst 36 is higher than the predetermined temperature, in comparison to a case in which the temperature of the catalyst 36 is less than or equal to the predetermined temperature, the return-time target air-fuel ratio in the lean return mode is set to a richer value that is within a range that conforms with the above described combustible range of air-fuel ratios in the internal combustion engine 10. As one example, in a case where the value of the return-time target air-fuel ratio that is set when the temperature of the catalyst 36 is less than or equal to the predetermined temperature is 18, the return-time target air-fuel ratio that is set when the temperature of the catalyst 36 is higher than the predetermined temperature is, for example, set to a value of 17. In this connection, this change in the return-time target air-fuel ratio that is based on the temperature of the catalyst 36 is also performed in the same manner in processing of step 304 that is executed if the ECU 40 determines in the above described step 114 that the counter value is not greater than the predetermined value α.

As described in the foregoing, according to the routine shown in FIG. 6, when the temperature of the catalyst 36 is higher than the aforementioned predetermined temperature, in comparison to a case in which the temperature of the catalyst 36 is less than or equal to the predetermined temperature, the return-time target air-fuel ratio in the lean return mode is set to a richer value that is within a range that conforms with the above described combustible range of air-fuel ratios in the internal combustion engine 10. By setting the return-time target air-fuel ratio in the lean return mode in this manner, a greater amount of oxygen is consumed in the cylinders by combustion when the catalyst 36 is a high temperature, and hence the amount of oxygen that flows into the catalyst 36 in an initial stage after valve return can be decreased. Therefore, according to the processing of the above described routine, it is possible to suppress deterioration of the catalyst 36 while avoiding the occurrence of misfiring at a time of return by execution of the above described lean return mode.

Note that, in the above described Embodiment 2, the "catalyst temperature acquisition means" according to the above described third aspect of the present invention is realized by the ECU 40 executing the processing of the aforementioned step 300.

DESCRIPTION OF SYMBOLS

- 10 internal combustion engine
- 14 combustion chamber
- 16 intake passage
- 18 exhaust passage
- 22 throttle valve
- 24 fuel injection valve
- 26 spark plug
- 28 intake valve
- 30 exhaust valve
- 32 intake variable valve operating apparatus
- 34 exhaust variable valve operating apparatus
- 36 catalyst
- 38 A/F sensor
- 40 Electronic Control Unit (ECU)
- 42 crank angle sensor
- 44 intake air pressure sensor
- 46 catalyst temperature sensor
- 48 accelerator pedal position sensor

The invention claimed is:

1. A control apparatus for an internal combustion engine, comprising:
   a fuel injection valve that injects fuel into an intake passage or into a cylinder;
   a valve stop mechanism that is capable of changing an operating state of at least one valve among an intake valve and an exhaust valve between a valve operating state and a closed-valve stopped state;
   fuel-cut operation execution means that executes a fuel-cut operation in a case where a predetermined execution condition is established during operation of the internal combustion engine;
   valve stopping execution means that executes valve stopping control that changes an operating state of the at least one valve from the valve operating state to the closed-valve stopped state at a time of execution of the fuel-cut operation;
   fuel-cut operation return request detection means that detects a request to return from the fuel-cut operation;
   valve return execution means that, when the request to return from the fuel-cut operation is detected, in synchrony with or in advance of an operation to resume fuel injection, executes a valve return operation that changes the operating state of the at least one valve from the closed-valve stopped state to the valve operating state; and
   return-time air-fuel ratio setting means that sets an in-cylinder target air-fuel ratio in initial return cycles that corresponds to an initial at least two cycles at a time of return from the fuel-cut operation,
   wherein the target air-fuel ratio is set so that respective air-fuel ratios of air-fuel mixtures of fuel and air injected into a same cylinder for respective cycles during the initial return cycles each become a value that falls within a combustible range, and is also set so that even if a total amount of fuel that is injected into a same cylinder for the initial return cycles is supplied into the cylinder during an arbitrary single cycle, an air-fuel ratio of an air-fuel mixture of the total amount of fuel and air becomes a value that falls within the combustible range.

2. The control apparatus for an internal combustion engine according to claim 1, further comprising:
   valve return abnormality determination means that determines whether or not an abnormality has occurred in the valve return operation; and
   fuel injection stopping means that stops fuel injection with respect to a cylinder for which the valve return abnormality determination means determines that an abnormality has occurred in the valve return operation after the initial return cycles have passed.

3. The control apparatus for an internal combustion engine according to claim 1, further comprising catalyst temperature acquisition means that acquires a temperature of a catalyst that is disposed in an exhaust passage,
   wherein, when the temperature of the catalyst is higher than a predetermined temperature, the return-time air-fuel ratio setting means sets the target air-fuel ratio to a richer value compared to when the temperature of the catalyst is less than or equal to the predetermined temperature.

4. The control apparatus for an internal combustion engine according to claim 1,
   wherein the target air-fuel ratios for respective cycles during the initial return cycles, which are set by the return-time air-fuel ratio setting means, are values that are leaner than a theoretical air-fuel ratio.

5. The control apparatus for an internal combustion engine according to claim 1,
   wherein the valve return execution means is means that, when a request to return from the fuel-cut operation is detected, executes the valve return operation in synchrony with an operation to resume fuel injection, and
   wherein fuel injection at the target air-fuel ratio that is set by the return-time air-fuel ratio setting means is started from a first cycle when executing the valve return operation in response to a request to return from the fuel-cut operation.

6. A control apparatus for an internal combustion engine, comprising:
   a fuel injection valve that injects fuel into an intake passage or into a cylinder;
   a valve stop mechanism that is capable of changing an operating state of at least one valve among an intake valve and an exhaust valve between a valve operating state and a closed-valve stopped state; and
   a controller that is programmed to:
   execute a fuel-cut operation in a case where a predetermined execution condition is established during operation of the internal combustion engine;
   execute valve stopping control that changes an operating state of the at least one valve from the valve operating state to the closed-valve stopped state at a time of execution of the fuel-cut operation;
   detect a request to return from the fuel-cut operation;
   execute, when the request to return from the fuel-cut operation is detected, in synchrony with or in advance of an operation to resume fuel injection, a valve return operation that changes the operating state of the at least one valve from the closed-valve stopped state to the valve operating state; and
   set an in-cylinder target air-fuel ratio in initial return cycles that corresponds to an initial at least two cycles at a time of return from the fuel-cut operation,
   wherein the target air-fuel ratio is set so that respective air-fuel ratios of air-fuel mixtures of fuel and air injected into a same cylinder for respective cycles during the initial return cycles each become a value that falls within a combustible range, and is also set so that even if a total amount of fuel that is injected into a same cylinder for the initial return cycles is supplied into the cylinder during an arbitrary single cycle, an air-fuel ratio of an air-fuel mixture of the total amount of fuel and air becomes a value that falls within the combustible range.

* * * * *